(12) United States Patent
Uchikawa et al.

(10) Patent No.: US 7,881,676 B2
(45) Date of Patent: Feb. 1, 2011

(54) RADIO-FREQUENCY COMMUNICATION CONTROL SYSTEM, RADIO-FREQUENCY COMMUNICATION CONTROL METHOD AND COMPUTER-READABLE STORAGE MEDIUM

(75) Inventors: Hideki Uchikawa, Kawasaki (JP); Kentaro Fukushima, Kawasaki (JP); Hideyuki Araki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 954 days.

(21) Appl. No.: 11/189,326

(22) Filed: Jul. 26, 2005

(65) Prior Publication Data

US 2006/0223470 A1 Oct. 5, 2006

(30) Foreign Application Priority Data

Mar. 31, 2005 (JP) ............................. 2005-104782

(51) Int. Cl.
*H03J 3/06* (2006.01)
*H03J 7/00* (2006.01)
*H03J 9/00* (2006.01)

(52) U.S. Cl. ............................. 455/75; 455/73; 375/344
(58) Field of Classification Search ........................ None
See application file for complete search history.

(56) References Cited

U.S. PATENT DOCUMENTS

| 5,797,102 | A | * | 8/1998 | Hallikainen et al. | .......... | 455/557 |
| 5,809,432 | A | * | 9/1998 | Yamashita | ............... | 455/575.1 |
| 6,091,967 | A | * | 7/2000 | Kruys et al. | ................. | 455/557 |
| 6,151,310 | A | * | 11/2000 | Dent | ........................... | 370/330 |
| 7,149,213 | B1 | * | 12/2006 | Rosner et al. | ............... | 370/379 |

(Continued)

FOREIGN PATENT DOCUMENTS

JP 6-043979 2/1994

(Continued)

OTHER PUBLICATIONS

European Search Report dated Jul. 2, 2007, from the corresponding European Application.

(Continued)

*Primary Examiner*—Dwayne D. Bost
*Assistant Examiner*—Frank Donado
(74) *Attorney, Agent, or Firm*—Katten Muchin Rosenman LLP

(57) ABSTRACT

An RF communication control system for executing the process of transmitting and receiving an RF signal through an RF control circuit unit and digitally processing the data contained in the RF signal through a baseband circuit unit, is disclosed. The baseband circuit unit includes a setting parameter holder for holding the setting parameter of each of a plurality of RF control elements, a setting parameter determining unit for determining, when the RF control element connected to the baseband circuit unit is switched to a second RF control element, the setting parameter to be used by the second RF control element after switching based on the setting information supplied from an external source, and a setting parameter selection processing unit for selecting the setting parameter corresponding to the second RF control element from the setting parameter holder based on the determined result and sending out the setting parameter to the second RF control element. An RF communication control method using the RF communication control system and a computer-readable storage medium to store the program for executing the RF communication control method by the computer, are also disclosed.

10 Claims, 14 Drawing Sheets

U.S. PATENT DOCUMENTS

| | | | |
|---|---|---|---|
| 7,173,923 B2 * | 2/2007 | Beach | 370/338 |
| 7,200,389 B2 * | 4/2007 | Date et al. | 455/419 |
| 7,324,475 B2 * | 1/2008 | Sato et al. | 370/329 |
| 2002/0065044 A1 * | 5/2002 | Ito | 455/41 |
| 2003/0134636 A1 * | 7/2003 | Sundar et al. | 455/432 |
| 2004/0029537 A1 | 2/2004 | Pugel et al. | |
| 2004/0036772 A1 | 2/2004 | Pugel et al. | |
| 2004/0166823 A1 * | 8/2004 | Alderton | 455/250.1 |
| 2004/0242196 A1 * | 12/2004 | Beach | 455/410 |
| 2005/0048977 A1 * | 3/2005 | Dorenbosch et al. | 455/441 |
| 2006/0148429 A1 * | 7/2006 | Inogai et al. | 455/115.1 |

FOREIGN PATENT DOCUMENTS

| | | |
|---|---|---|
| JP | 200177769 | 3/2001 |
| JP | 2001258074 | 9/2001 |
| JP | 2004-23403 | 1/2004 |
| JP | 2004-510377 | 4/2004 |
| WO | WO 02/27924 | 4/2002 |
| WO | 2004/030228 | 4/2004 |
| WO | 2004/077507 | 9/2004 |

OTHER PUBLICATIONS

Andrew Fogg. "DigRF Baseband/RF Digital Interface Specification" Feb. 2004, XP002325710, retrieved from the Internet http://146.101/169.51/DigRF%20Standard%20v112.pdf.

Notice of Reasons for Rejection, dated May 18, 2010, from the corresponding Japanese Application No. 2005-104782.

Japanese Office Action (Notice of Reasons for Rejection) dated Sep. 28, 2010, and an English-language translation thereof, from the corresponding Japanese Patent Application No. 2005-104782.

* cited by examiner

Fig.5

| X | PROCESS |
|---|---|
| 0 | RF RECEIVER PROCESS |
| 1 | RF TRANSMITTER PROCESS |
| 2 | RF RECEIVER FREQUENCY SETTING PROCESS |
| 3 | RF TRANSMITTER FREQUENCY SETTING PROCESS |
| ⋮ | ⋮ |
| m | OTHER PROCESSES |

(m: ARBITRARY POSITIVE INTEGER NOT LESS THAN 4)

Fig.6

| Y | PROCESS |
|---|---|
| 0 | NO SET VALUE SENT OUT |
| 1 | FIRST SET VALUE SENT OUT |
| 2 | SECOND SET VALUE SENT OUT |
| 3 | THIRD SET VALUE SENT OUT |
| ⋮ | ⋮ |
| n | nTH SET VALUE SENT OUT |

(n: ARBITRARY POSITIVE INTEGER NOT LESS THAN 1)

Fig.7

| EVENT | NUMBER OF TIMES IN WHICH SET VALUE IS SENT OUT | | |
|---|---|---|---|
| | RF CONTROL ELEMENT #1 | RF CONTROL ELEMENT #2 | RF CONTROL ELEMENT #3 |
| RF RECEIVER PROCESS | 2 | 1 | 1 |
| RF TRANSMITTER PROCESS | 1 | 2 | 1 |
| RF RECEIVER FREQUENCY SETTING PROCESS | 3 | 1 | 1 |
| RF TRANSMITTER FREQUENCY SETTING PROCESS | 1 | 3 | 2 |

TABLE OF THE NUMBER OF TIMES IN WHICH THE EVENT SET VALUE IS TRANSMITTED FOR RF CONTROL ELEMENTS #1 TO #3

Fig.8

| EVENT | RF CONTROL ELEMENT #1 |
|---|---|
| RF RECEIVER PROCESS | 2 |
| RF TRANSMITTER PROCESS | 1 |
| RF RECEIVER FREQUENCY SETTING PROCESS | 3 |
| RF TRANSMITTER FREQUENCY SETTING PROCESS | 1 |

TABLE OF THE NUMBER OF TIMES IN WHICH THE EVENT SET VALUE IS TRANSMITTED FOR RF CONTROL ELEMENT #1

Fig.9

| Y \ X | 0 | 1 | 2 | 3 |
|---|---|---|---|---|
| 0 (RF RECEIVER PROCESS) | NUMBER OF TIMES IN WHICH SET VALUE IS SENT OUT | FIRST SET VALUE SENT OUT CONCERNING RECEIVER | SECOND SET VALUE SENT OUT CONCERNING RECEIVER | |
| 1 (RF TRANSMITTER PROCESS) | NUMBER OF TIMES IN WHICH SET VALUE IS SENT OUT | FIRST SET VALUE SENT OUT CONCERNING TRANSMITTER | | |
| 2 (RF RECEIVER FREQUENCY SETTING PROCESS) | NUMBER OF TIMES IN WHICH SET VALUE IS SENT OUT | FIRST SET VALUE SENT OUT FOR CONTROLLING RECEIVING FREQUENCY CONCERNING RECEIVER | SECOND SET VALUE SENT OUT FOR CONTROLLING RECEIVING FREQUENCY CONCERNING RECEIVER | THIRD SET VALUE SENT OUT FOR CONTROLLING RECEIVING FREQUENCY CONCERNING RECEIVER |
| 3 (RF TRANSMITTER FREQUENCY SETTING PROCESS) | NUMBER OF TIMES IN WHICH SET VALUE IS SENT OUT | FIRST SET VALUE SENT OUT FOR CONTROLLING TRANSMITTING FREQUENCY CONCERNING TRANSMITTER | | |

2D MATRIX TABLE OF EVENT AND EVENT SET VALUE

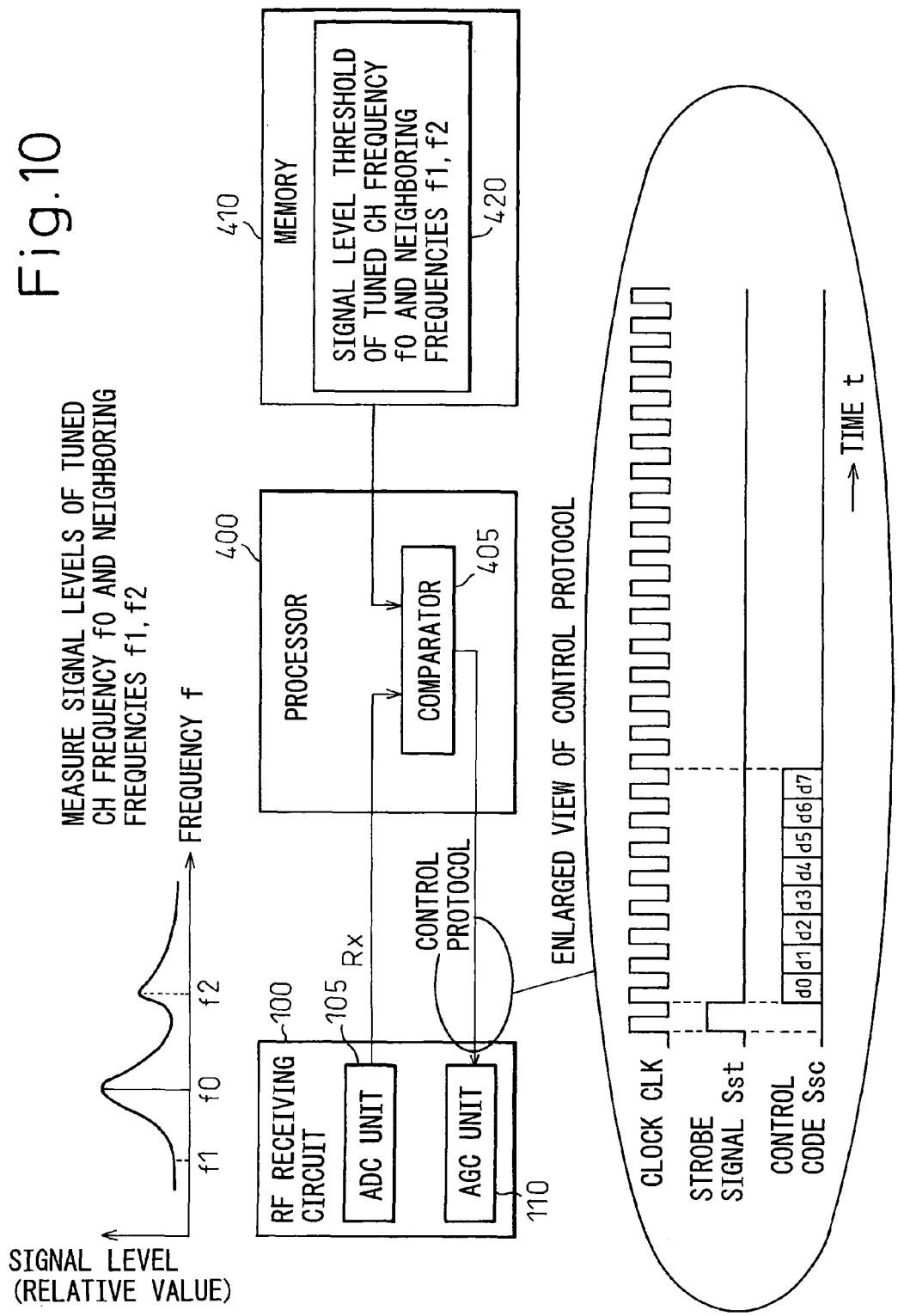

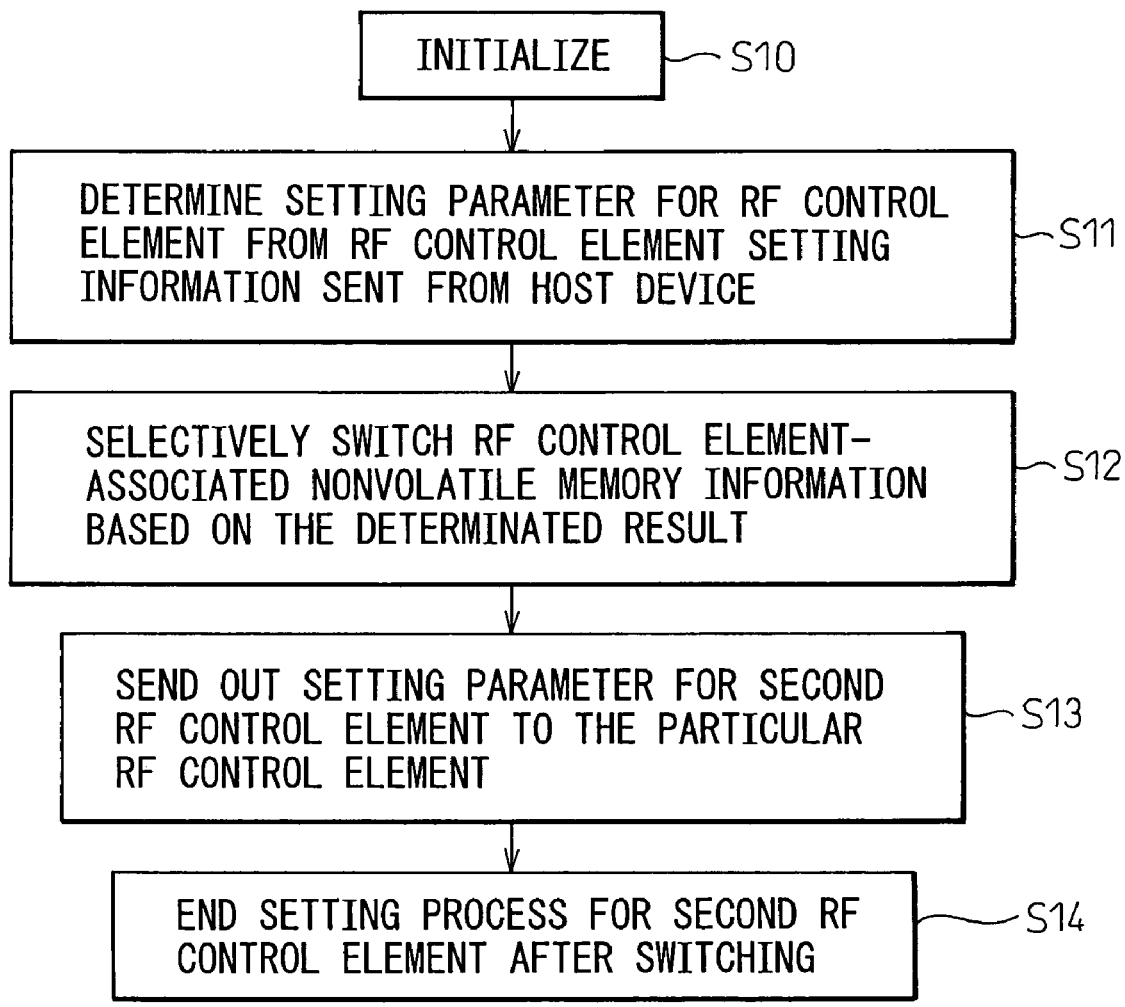

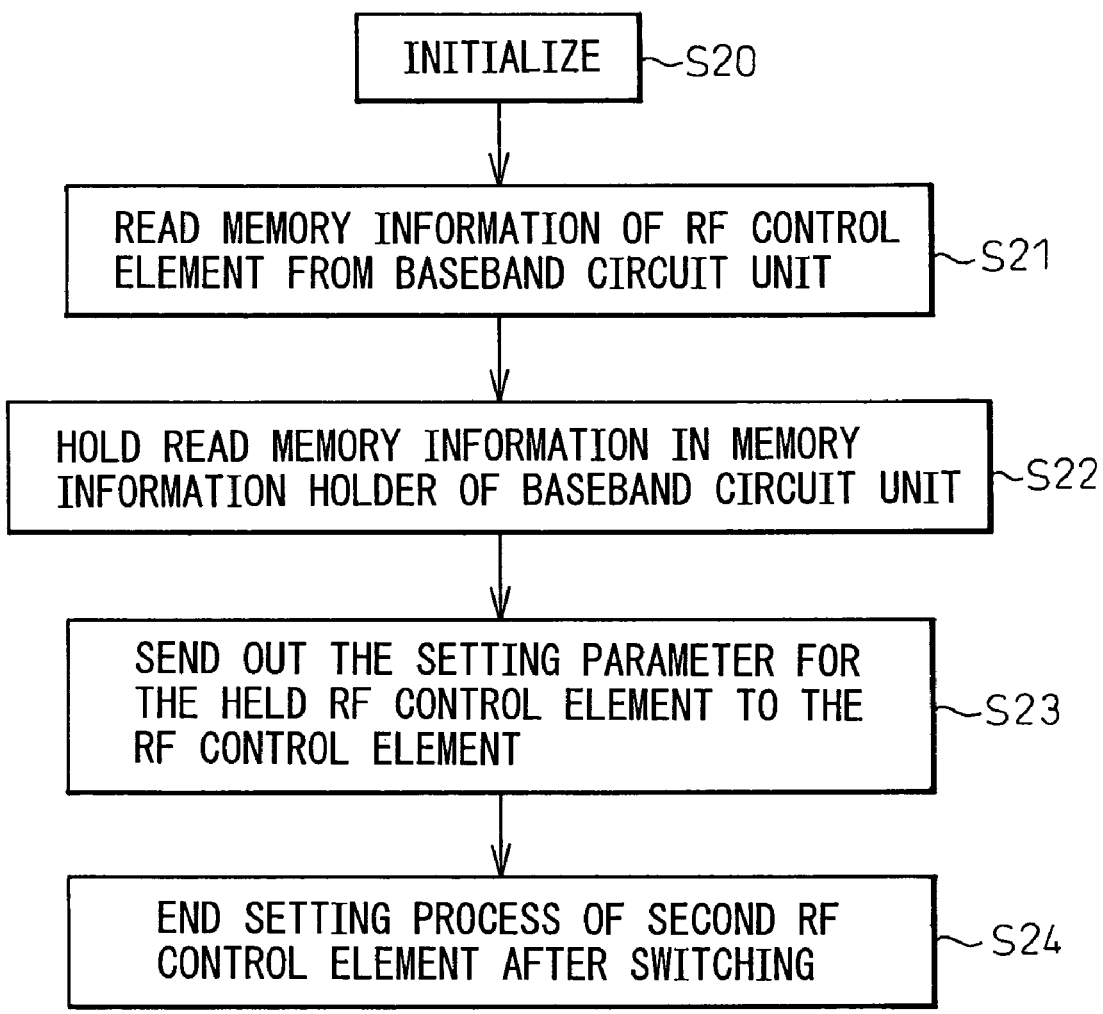

RADIO-FREQUENCY COMMUNICATION CONTROL SYSTEM, RADIO-FREQUENCY COMMUNICATION CONTROL METHOD AND COMPUTER-READABLE STORAGE MEDIUM

BACKGROUND OF THE INVENTION

1. Field of the Invention

This invention relates to a radio-frequency communication control system and a radio-frequency communication control method for a radio communication device, such as a mobile phone, in which a single-chip radio-frequency control circuit unit (normally called a RF control circuit unit) executes the process of transmitting and receiving a radio-frequency signal, and a baseband circuit unit (also called the baseband element) constituting another chip executes various digital processes on the data contained in the radio-frequency signal sent out from the radio-frequency control circuit unit.

In particular, this invention relates to a technique in which, in order to effectively utilize a plurality of radio-frequency control elements (normally called the RF control elements) included in the radio-frequency control circuit unit, an arbitrary one radio-frequency control element selected by the user, etc. can be connected to the baseband circuit unit by a simple method.

2. Description of the Related Art

Generally, a radio communication device, such as a mobile phone of the W-CDMA (wideband code division multiple access) type, comprises a radio-frequency communication control system (hereinafter referred to as the RF communication control system), including a single-chip radio-frequency communication control unit (hereinafter referred to as the RF communication control unit) having mounted therein a single-chip radio-frequency control circuit unit used primarily for handling an analog radio signal, and a chip having mounted thereon a baseband circuit unit primarily for handling digital data converted into a low-frequency signal.

The term "W-CDMA" indicates one of multiple connection systems for radio communication in which a radio wave in the same frequency band wider than CDMA (for example, 800 MHz to 2 GHz) is shared efficiently by a plurality of users using a spectrum spreading technique similar to the one for CDMA.

In the RF communication control system used in the conventional radio communication device, an arbitrary one of RF control elements in the RF control circuit unit is connected to the baseband circuit unit using a one-to-one interface of the baseband circuit unit.

In this setting method, however, all the interfaces of the baseband circuit unit are required to be changed each time one RF control element is changed to another RF control element (hereinafter referred to as the second RF control element). This makes it unavoidable to change the firmware (or software) processing system such as DSP (digital signal processor) required to set the interface of the baseband circuit unit appropriately.

In the RF communication control system used with the conventional radio communication device, therefore, the problem occurs in that the increased cost and labor is required to change the firmware processing system of the baseband circuit unit when changing the RF control element connected to the baseband circuit unit. As a result, a plurality of RF control elements cannot be efficiently used as resources.

For reference, Japanese Unexamined Patent Publication (Kohyo) No. 2004-510377 (Patent Document 1) and Japanese Unexamined Patent Publication (Kokai) No. 6-43979 (Patent Document 2) related to conventional RF communication control systems are described below.

Patent Document 1 discloses a signal processing device in which a low-noise exponential amplifier in an RF control element performs the selective control operation in such a manner that the magnitude of the signal level of a tuned channel frequency is compared with a predetermined threshold and, in accordance with the result of this comparison, it is determined whether or not the AGC (automatic gain control) operation in the RF control element is performed. At the same time, it is determined whether or not the AGC operation is performed also for the neighboring frequencies. Patent Document 1, however, never refers to the operation of changing the RF control element connected to the baseband element.

Patent Document 2, on the other hand, discloses a portable electronic device in which even in the case in which the battery is changed during communication, the operation of the portable radio telephone is restored to the state immediately before the source voltage stops being supplied, based on the information stored in a nonvolatile memory. Also in Patent Document 2, as in Patent Document 1 described above, however, the operation of changing the RF control element connected to the baseband element is not described.

The systems disclosed in Patent Documents 1 and 2, therefore, both pose the same problem as the conventional RF communication control system when changing the RF control element connected to the baseband element.

SUMMARY OF THE INVENTION

The present invention has been developed in view of the problem described above, and the object of the invention is to provide an RF communication control system, an RF communication control method and a computer-readable storage medium, in which an RF control element connected to the baseband circuit unit is changed by connecting another RF control element (hereinafter referred to as the second RF control element) to the baseband circuit unit by a simple method without taking the trouble to change the firmware of the processing system of the baseband circuit unit.

In order to achieve the object described above, according to one aspect of the present invention, there is provided an RF communication control system comprising an RF control circuit unit for executing the process of transmitting and receiving an RF signal and a baseband circuit unit for executing various digital processes on the data contained in the RF signal sent out from the RF control circuit unit; wherein the RF control circuit unit includes a plurality of RF control elements one of which is selectively connected to the baseband circuit unit; wherein the baseband circuit unit includes a setting parameter holder for holding the setting parameter of each of the RF control elements, a setting parameter determining unit for determining, in the case in which the RF control circuit element connected to the baseband circuit unit is switched to a second RF control element, the setting parameter to be used for the second RF control element based on the setting information supplied from an external source for the second RF control element, and a setting parameter selection processing unit for selecting the setting parameter corresponding to the second RF control element from the setting parameter holder based on the result determined by the setting parameter determining unit and sending out the setting parameter to the second RF control element.

Preferably, in the RF communication control system according to the present invention, the setting information for the second RF control element is supplied from an external setting pin included in the baseband circuit unit.

Preferably, in the RF communication control system according to the present invention, the setting information for the second RF control element is supplied from a host device for controlling the baseband circuit unit.

According to another aspect of the present invention, there is provided an RF communication control system comprising an RF control circuit unit for executing the process of transmitting and receiving an RF signal and a baseband circuit unit for executing various digital processes on the data contained in the RF signal sent out from the RF control circuit unit; wherein the RF control circuit unit includes a plurality of RF control elements each having a setting parameter holder for holding the setting parameter of each of the RF control elements; wherein one of the plurality of the RF control elements is selectively connected to the baseband circuit unit; wherein the baseband circuit unit includes a setting parameter selection processing unit for reading and holding, in the case in which the RF control circuit element connected to the baseband circuit unit is switched to a second RF control element, the setting parameter held in the setting parameter holder of the second RF control element and sending out the setting parameter to the second RF control element.

According to still another aspect of the present invention, there is provided an RF communication control method; wherein an RF control circuit unit including a plurality of RF control elements executes the process of transmitting and receiving the RF signal and a baseband circuit unit executes various digital processes on the data contained in the RF signal; wherein one of the plurality of the RF control elements is connected to the baseband circuit unit; wherein the setting parameter of each of the RF control elements is held by the setting parameter holder of the baseband circuit unit; wherein in the case in which the RF control element connected to the baseband circuit unit is switched to a second RF control element, the setting parameter to be used for the second RF control element is determined based on the setting information supplied from an external source for the second RF control element; and wherein the setting parameter corresponding to the second RF control element is selected based on the result determined by the setting parameter and sent out to the second RF control element.

In short, according to this invention, first, by taking into consideration the fact that the setting parameter for the RF control elements of the radio communication device used in W-CDMA format is comparatively specified, the setting parameter of each of a plurality of the RF control elements is held by the setting parameter holder (for example, a nonvolatile memory information holder) of the baseband circuit unit. In the case in which the RF control element connected to the baseband circuit unit is switched to a second RF control element, the setting parameter to be used for the second RF control element is determined based on the setting information supplied from an external source for the RF control element (for example, the information on the signal indicating that one RF control element is switched to a second RF control element). Based on this determined result, the setting parameter corresponding to the second RF control element is selected and sent out to the second RF control element.

In this first technique according to the present invention, one RF control element connected to the baseband circuit unit can be switched easily to a second RF control element simply by changing the setting parameter selected from the setting parameter holder of the baseband circuit unit without taking the trouble to change the processing format such as the firmware of the baseband circuit unit. Thus, the cost and labor which otherwise might be required to change the processing format of the firmware are saved.

According to the present invention, second, by taking into consideration the fact that the setting parameter for the RF control elements of the radio communication device used in W-CDMA format is specified comparatively, the setting parameter of each of a plurality of RF control elements is held in advance by the setting parameter holder of each of a plurality of RF control circuits. When the RF control element connected to the baseband circuit unit is switched to a second RF control element, the setting parameter held in the setting parameter holder of the second RF control element is read, held in the baseband circuit unit and sent out to the second RF control element.

In the second technique according to the present invention, substantially as in the first technique described above, one RF control element connected to the baseband circuit unit can be easily switched to a second RF control element simply by sending out the setting parameter read from the setting parameter holder of the RF control element to the second RF control element without taking the trouble to change the processing format such as the firmware of the baseband circuit unit. Thus, the cost and labor which otherwise might be required to change the processing format such as the firmware are saved.

BRIEF DESCRIPTION OF THE DRAWINGS

The above object and features of the present invention will be more apparent from the following description of some preferred embodiments with reference to the accompanying drawings, wherein:

FIG. 5 is a data format diagram showing a specific example of an event table of nonvolatile memory information used in an embodiment of the present invention;

FIG. 6 is a data format diagram showing a specific example of an event set value table of nonvolatile memory information used in an embodiment of the present invention;

FIG. 7 is a data format diagram showing a specific example of a table showing the number of times in which the event set value is sent out for a plurality of RF control elements;

FIG. 8 is a data format diagram showing a specific example of a table showing the number of times in which the event set value is sent out for a specified one of the RF control elements;

FIG. 9 is a data format diagram showing a specific example of a table showing a two-dimensional (2D) matrix of the events and the event set values for a specified RF control element;

FIG. 10 is a signal flow diagram showing the manner in which a RF low-noise exponential amplifier performs the selective control operation in the conventional RF communication control system;

FIG. 12 is a flowchart for explaining the flow of the process for setting the setting parameter corresponding to the second RF control element according to the embodiment shown in FIG. 3; and FIG. 13 is a flowchart for explaining the flow of the process for setting the setting parameter corresponding to the second RF control element according to the embodiment shown in FIG. 4.

DESCRIPTION OF THE PREFERRED EMBODIMENTS

With reference to the accompanying drawings (FIGS. 1 to 13), the configuration and operation of preferred embodiments of the present invention are explained below.

Figure 1:
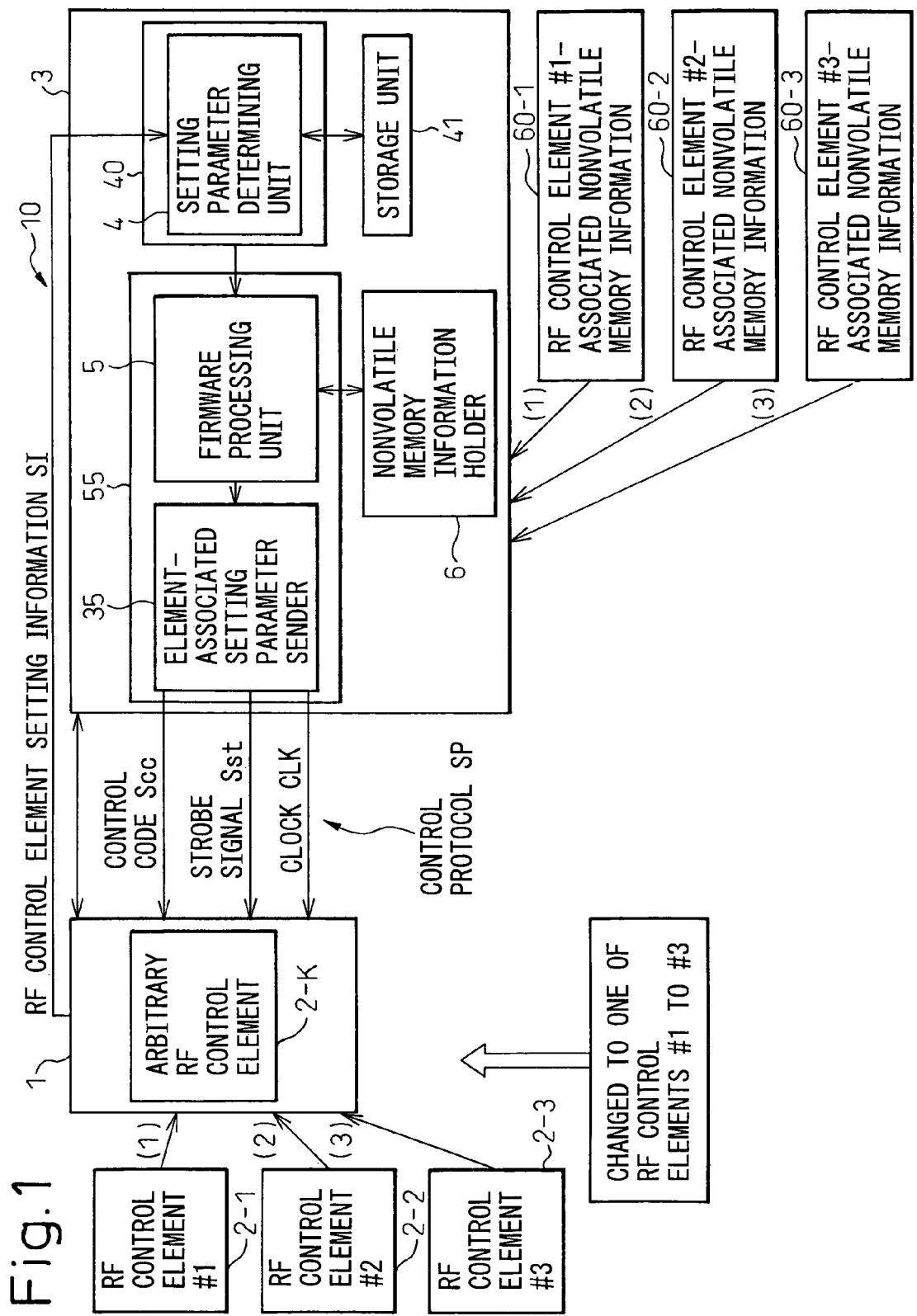
FIG. 1 is a block diagram showing a configuration of an RF communication control system according to a first embodiment of the present invention.

FIG. 1 is a block diagram showing a configuration of an RF communication control system according to a first embodiment of the present invention. In this case, a simplified configuration of an RF communication control system 10 according to the first embodiment is explained. In the description that follows, similar and identical component elements are designated by the same reference numerals.

The RF communication control system 10 shown in FIG. 1 comprises an RF control circuit unit 1 for executing the process of transmitting and receiving an RF signal using the W-CDMA format and a baseband circuit unit 3 for executing various digital processes on the data contained in the RF signal or the intermediate-frequency signal sent out from the RF control circuit unit 1.

The RF control circuit unit 1 has the function, primarily, to transmit and receive an analog RF signal and convert it to an intermediate-frequency signal. The baseband circuit unit 3, on the other hand, includes an analog-to-digital converter (not shown) having the function to convert an analog signal sent out from the RF control circuit unit 1 into a digital signal, reproduce the desired data contained in the digital signal and execute various digital processes on the data using a DSP (not shown) or the like. Preferably, the RF control circuit unit 1 and the baseband circuit unit 3 are fabricated independently of each other using a LSI (large scale integrated circuit) chip.

More specifically, the RF control circuit unit 1 shown in FIG. 1 includes an arbitrary RF control element (indicated as an arbitrary RF control element in FIG. 1) 2-k (k: a given positive integer). This RF control element (arbitrary RF control element) 2-k is selected through routes (1) to (3) from a plurality of RF control elements (typically including three RF control elements, i.e. an RF control element #1 (2-1), an RF control element #1 (2-2) and an RF control element #1 (2-3) in FIG. 1), and connected to the baseband circuit unit 3. In this case, an example is shown in which the chip of the RF control circuit unit 1 includes one of a plurality of the RF control elements #1 to #3. Depending on the size of the chip, however, all of the plurality of the RF control elements #1 to #3 may be included.

The baseband circuit unit 3 shown in FIG. 1, on the other hand, includes a nonvolatile memory information holder 6 for holding the setting parameter of each of a plurality of the RF control elements #1 to #3. The nonvolatile memory information holder 6 corresponds to the setting parameter holder according to the present invention and is configured of a rewritable nonvolatile memory such as a ROM (read-only memory). The information stored in the nonvolatile memory information holder 6 can be rewritten into the nonvolatile memory information corresponding to the currently selected RF control element (FIG. 1 shows an example in which the nonvolatile memory information (60-1) corresponding to the RF control element #1 (hereinafter sometimes referred to as the RF control element #1-associated nonvolatile memory information, as in the other nonvolatile memory information), the nonvolatile memory information (60-2) corresponding to the RF control element #2 and the nonvolatile memory information (60-3) corresponding to the RF control element #3 are rewritten through corresponding routes (1) to (3), respectively). In this example, the chip of the baseband circuit unit 3 holds one of a plurality of nonvolatile memory information corresponding to a plurality of RF control elements. Depending on the size of the chip, however, all of a plurality of nonvolatile memory information for a plurality of RF control elements corresponding to a plurality of RF control elements can be included. A specific format of the nonvolatile memory information corresponding to the RF control element is explained in detail, later, with reference to FIGS. 5 to 9.

Further, the baseband circuit unit 3 shown in FIG. 1 includes a setting parameter determining unit 4. When an RF control element connected to the baseband circuit unit 3 is switched to another RF control element (hereinafter sometimes referred to as a second RF control element), the setting parameter determining unit 4 determines the setting parameter used for the second RF control element based on the RF control element setting information (for example, the information on the signal indicating that one of the RF control elements is switched to a second RF control element) SI supplied from an external source for the setting of the second RF control element. Preferably, the function of the setting parameter determining unit 4 is implemented by a CPU 40 of a computer system. The CPU 40 includes a storage unit 41 such as a ROM or a RAM (random access memory). The storage unit 41 may be replaced with a ROM or a RAM built into the CPU 40.

More specifically, the setting parameter determining program stored in the ROM, etc. and the various data required to execute the program stored in the RAM, etc. are read by the CPU 40 and the program is executed. In this way, the function corresponding to the setting parameter determining unit 4 is realized.

Further, the baseband circuit unit 3 shown in FIG. 1 includes a setting parameter selection processing unit 55 for selecting the nonvolatile memory information corresponding to the second RF control element after switching from the nonvolatile memory information holder 6 and sending out the nonvolatile memory information to the second RF control element (for example, the arbitrary RF control element 2-k) of the RF control circuit unit 1. The setting parameter selection processing unit 55 includes a firmware processing unit 5 for rewriting the nonvolatile memory information currently held in the nonvolatile memory information holder 6 into the nonvolatile memory information corresponding to the second RF control element and selecting a setting parameter corresponding to the particular RF control element, and an element-associated setting parameter sender 35 for sending out the setting parameter selected by the firmware processing unit 5 to the second RF control element of the RF control circuit unit 1. Preferably, the functions of the firmware processing unit 5 and the element-associated setting parameter sender 35 are realized by a DSP (not shown) for processing the digital signal by firmware.

More specifically, the program stored in the storage unit 41 of the baseband circuit unit 3 shown in FIG. 1 includes the step of determining the setting parameter to be used for the second RF control element, based on the setting information supplied from an external source for setting the second RF control element when one of the RF control elements connected to the baseband circuit unit is switched to the second RF control element, and the step of selecting the setting parameter corresponding to the second RF control element based on the result determined by the setting parameter and sending out the particular setting parameter to the second RF control element.

Further, according to the first embodiment of the present invention, in the case in which the CPU or the DSP is operated using a computer-readable storage medium (or recording medium), a storage medium (not shown) holding the contents of the program described above is preferably prepared. Incidentally, the storage medium according to the first embodiment is not limited to the one described above, but an arbitrary portable medium, such as a floppy disk, a MO (magneto-optical disk), a CD-R (compact disk-recordable), a CD-ROM (compact disk read-only memory) or the like, and other fixed media of various types, can be used.

The second RF control element (after switching) of the RF control circuit unit 1 shown in FIG. 1 is controlled by the control protocol SP contained in the setting parameter sent out from the element-associated setting parameter sender 35. Especially, it should be noted that the contents of the control protocol SP of the RF control element in W-CDMA format is comparatively specified. This control protocol SP includes the serial control code Scc used as an interface of the set value of the setting parameter, the strobe signal Ss and the clock CLK. The contents of the serial control code Scc relate to, for example, the receiver setting process, the transmitter setting process, transmitter frequency setting process and the receiver frequency setting process. According to the embodiment shown in FIG. 1, the interface of the set value of the setting parameter is a control code, in serial form, to which the present invention is not limited.

According to the first embodiment of the present invention, the setting parameter of each of a plurality of RF control elements is held in advance by the nonvolatile memory information holder of the baseband circuit unit. In the case in which one RF control element connected to the baseband circuit unit is switched to a second RF control element, the setting parameter to be used for the second RF control element (after switching) is determined by a CPU or the like based on the RF control element-associated setting information supplied from an external source, and according to the determined result, the setting parameter corresponding to the second RF control element is selected by the DSP or the like and sent out to the second RF control element.

According to the first embodiment of the present invention, therefore, one RF control element is connected to the baseband circuit unit can be switched and changed to a second RF control element easily simply by changing the control protocol selected from the nonvolatile memory information holder of the baseband circuit unit without taking the trouble to change the firmware processing format of the baseband circuit unit.

Figure 2:
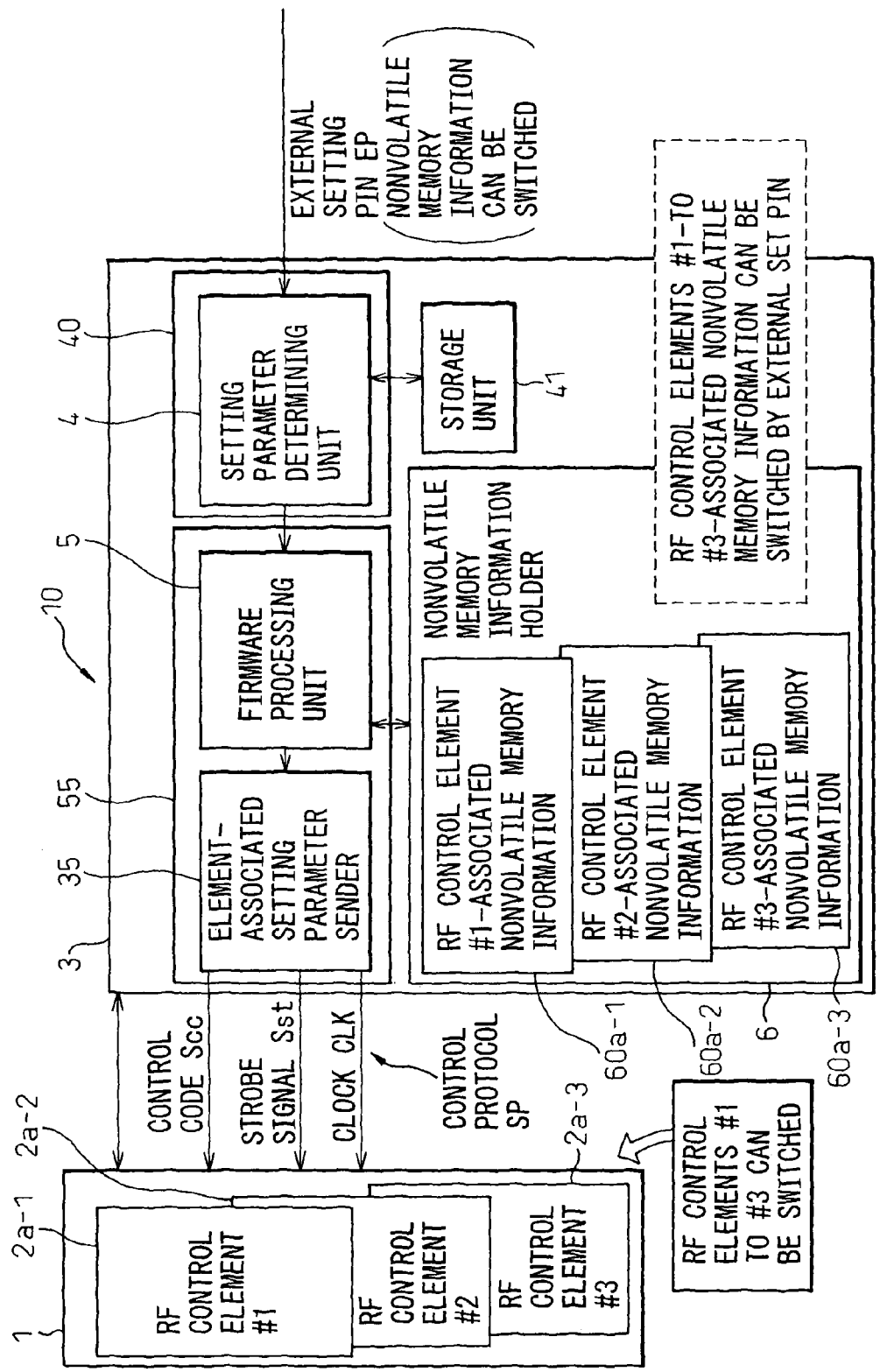
FIG. 2 is a block diagram showing a configuration of an RF communication control system according to a second embodiment of the present invention.

FIG. 2 is a block diagram showing a configuration of an RF communication control system according to a second embodiment of the present invention. Also in this case, the configuration of an RF communication control system 10 according to a second embodiment of the present invention is shown in simplified form.

The RF communication control system 10 according to the second embodiment of the present invention, like the RF communication control system according to the first embodiment shown in FIG. 1, comprises an RF control circuit unit 1 for executing the process of transmitting and receiving an RF signal and a baseband circuit unit 3 for executing various digital processes on the data contained in the RF signal or the intermediate-frequency signal sent out from the RF control circuit unit 1. Preferably, the RF control circuit unit 1 and the baseband circuit unit 3 are each fabricated of a LSI chip independently of each other.

The chip of the RF control circuit unit 1 shown in FIG. 2, unlike the first embodiment shown in FIG. 1, is configured to include all the RF control elements #1 to #3. One of the plurality of the RF control elements #1 to #3 (three RF control elements #1, i.e. an RF control element #1 (2a-1), an RF control element #2 (2a-2) and an RF control element #3 (2a-3) are typically shown in FIG. 2) is connected switchably to the baseband circuit unit 3.

On the other hand, the baseband circuit unit 3 includes a nonvolatile memory information holder 6 for holding the setting parameter of each of a plurality of RF control elements #1 to #3. This nonvolatile memory information holder 6 corresponds to the setting parameter holder according to one aspect of the present invention, and is configured of a rewritable nonvolatile memory such as a ROM. This nonvolatile memory information holder 6 holds the nonvolatile memory information corresponding to a plurality of RF control elements #1 to #3 (the nonvolatile memory information (60a-1) corresponding to the RF control element #1, the nonvolatile memory information (60a-2) corresponding to the RF control element #2 and the nonvolatile memory information (60a-3) corresponding to the RF control element #3 in FIG. 2). In this way, the setting parameter selection processing unit 55 selects the nonvolatile memory information corresponding to a second RF control element after switching. A specific format of the nonvolatile memory information corresponding to the RF control element described above is described in detail, later, with reference to FIGS. 5 to 9.

Further, in the baseband circuit unit 3 shown in FIG. 2, the nonvolatile memory information corresponding to the RF control element can be switched by providing the setting information supplied from an external setting pin EP for setting the RF control element. More specifically, the external setting pin EP is switched when switching one RF control element connected to the baseband circuit unit 3 to a second RF control element. Based on the setting information provided by this external setting pin EP, the nonvolatile memory information corresponding to the RF control element held in the nonvolatile memory information holder 6 can be selectively switched.

Further, the baseband circuit unit 3 shown in FIG. 2 includes a setting parameter determining unit 4 for determining the setting parameter to be used in a second RF control element after switching based on the setting information provided by the external setting pin EP when switching one RF control element connected to the baseband circuit unit 3 to the second RF control element. Preferably, the function of the setting parameter determining unit 4 is implemented by a CPU 40 of a computer system. The CPU 40 includes a storage unit 41 such as a ROM or a RAM.

Furthermore, the baseband circuit unit 3 shown in FIG. 2, as in the embodiment shown in FIG. 1, includes a setting parameter selection processing unit 55 for selecting the nonvolatile memory information corresponding to the second RF control element after switching from the nonvolatile memory information holder 6 and sending out the selected nonvolatile memory information to the second RF control element of the RF control circuit unit 1 based on the result determined by the setting parameter determining unit 4. This setting parameter selection processing unit 55 includes a firmware processing unit 5 for selecting the setting parameter contained in the nonvolatile memory information corresponding to the second RF control element held in the nonvolatile memory information holder 6 in accordance with the result determined by the setting parameter determining unit 4, and an element-associated setting parameter sender 35 for sending out the setting parameter selected by the firmware processing unit 5 to the second RF control element after switching of the RF control circuit unit 1. Preferably, the functions of the firmware processing unit 5 and the element-associated setting parameter sender 35 are implemented by a DSP (not shown) for processing the digital signal by firmware.

The second RF control element after switching of the RF control circuit unit 1 shown in FIG. 2, as in the embodiment shown in FIG. 1 described above, is controlled by the control protocol SP contained in the setting parameter sent out from the element-associated setting parameter sender 35. This control protocol SP includes a serial control code Scc, a strobe signal Ss and a clock CLK used as an interface of the set value of the setting parameter. Incidentally, according to the second embodiment shown in FIG. 2, the interface of the set value of the setting parameter is a serial control code, to which the present invention is not limited.

According to the second embodiment of the present invention, as in the first embodiment, one RF control element connected to the baseband circuit unit can be switched and changed easily to a second RF control element simply by changing the control protocol selected from the nonvolatile memory information holder of the baseband circuit unit without taking the trouble to change the firmware processing format of the baseband circuit unit.

Figure 3:
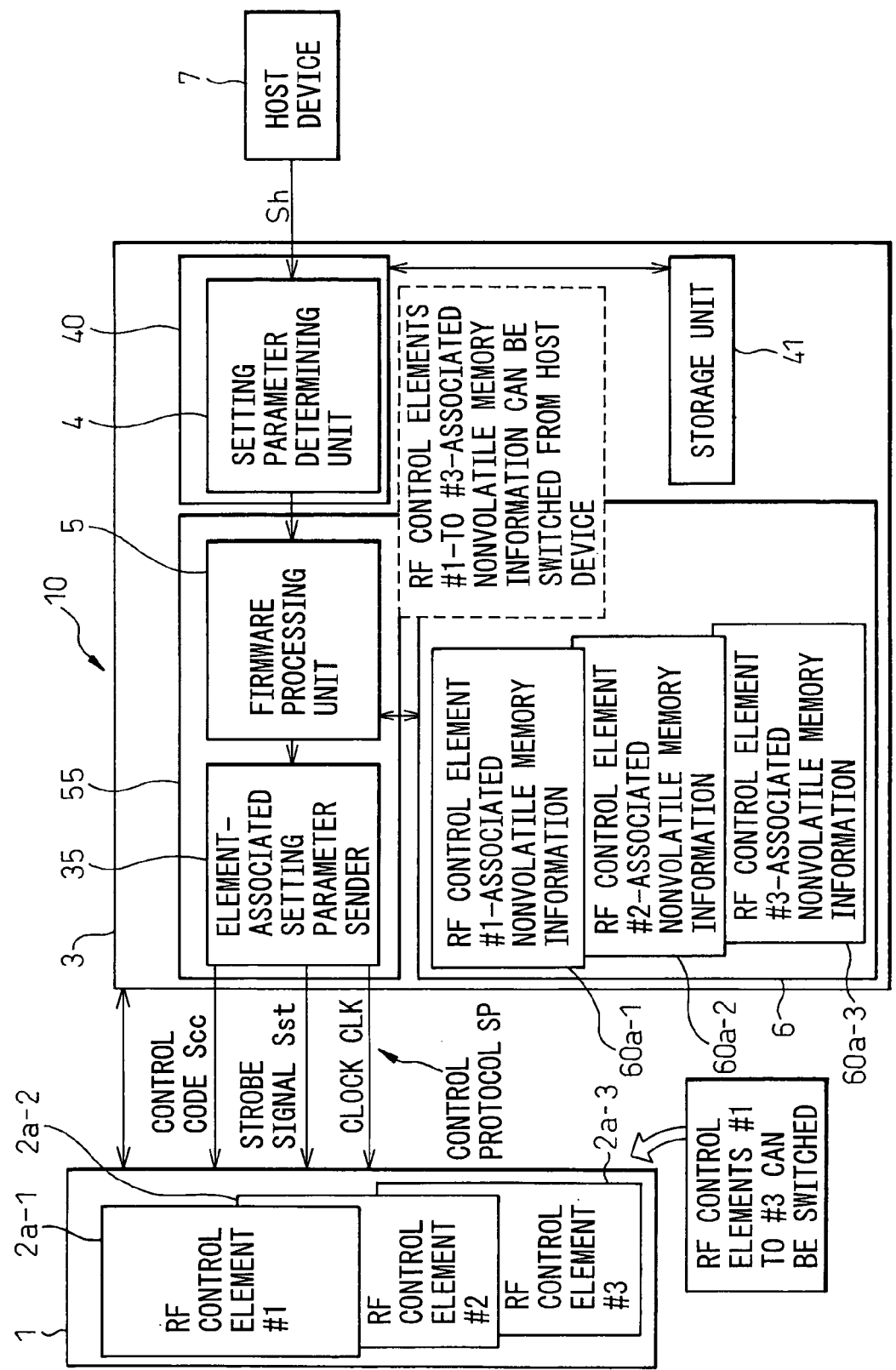
FIG. 3 is a block diagram showing a configuration of an RF communication control system according to a third embodiment of the present invention.

FIG. 3 is a block diagram showing a configuration of an RF communication control system according to a third embodiment of the present invention. Also in this case, the configuration of an RF communication control system 10 according to the third embodiment is shown in simplified form.

The RF communication control system 10 according to the third embodiment shown in FIG. 3 has substantially the same configuration as the second embodiment of the present invention described above. According to the third embodiment shown in FIG. 3, however, unlike the second embodiment shown in FIG. 2, the nonvolatile memory information corresponding to an RF control element can be switched by the setting information for setting the RF control element, supplied from a host device 7 for controlling the baseband circuit unit 3. More specifically, when switching one RF control element connected to the baseband circuit unit 3 to a second RF control element, the nonvolatile memory information corresponding to the RF control element held in the nonvolatile memory information holder 6 can be selectively switched based on the switching information (setting information) provided by a host application of the host device. A specific format of the nonvolatile memory information corresponding to the RF control element is described in detail, later, with reference to FIGS. 5 to 9.

The configuration and the operation of each part of the baseband circuit unit 3 according to the embodiment shown in FIG. 3 is substantially the same as those of the baseband circuit unit according to the embodiment shown in FIG. 2. Each component part of the baseband circuit unit 3 shown in FIG. 3, therefore, is not described again.

Figure 4:
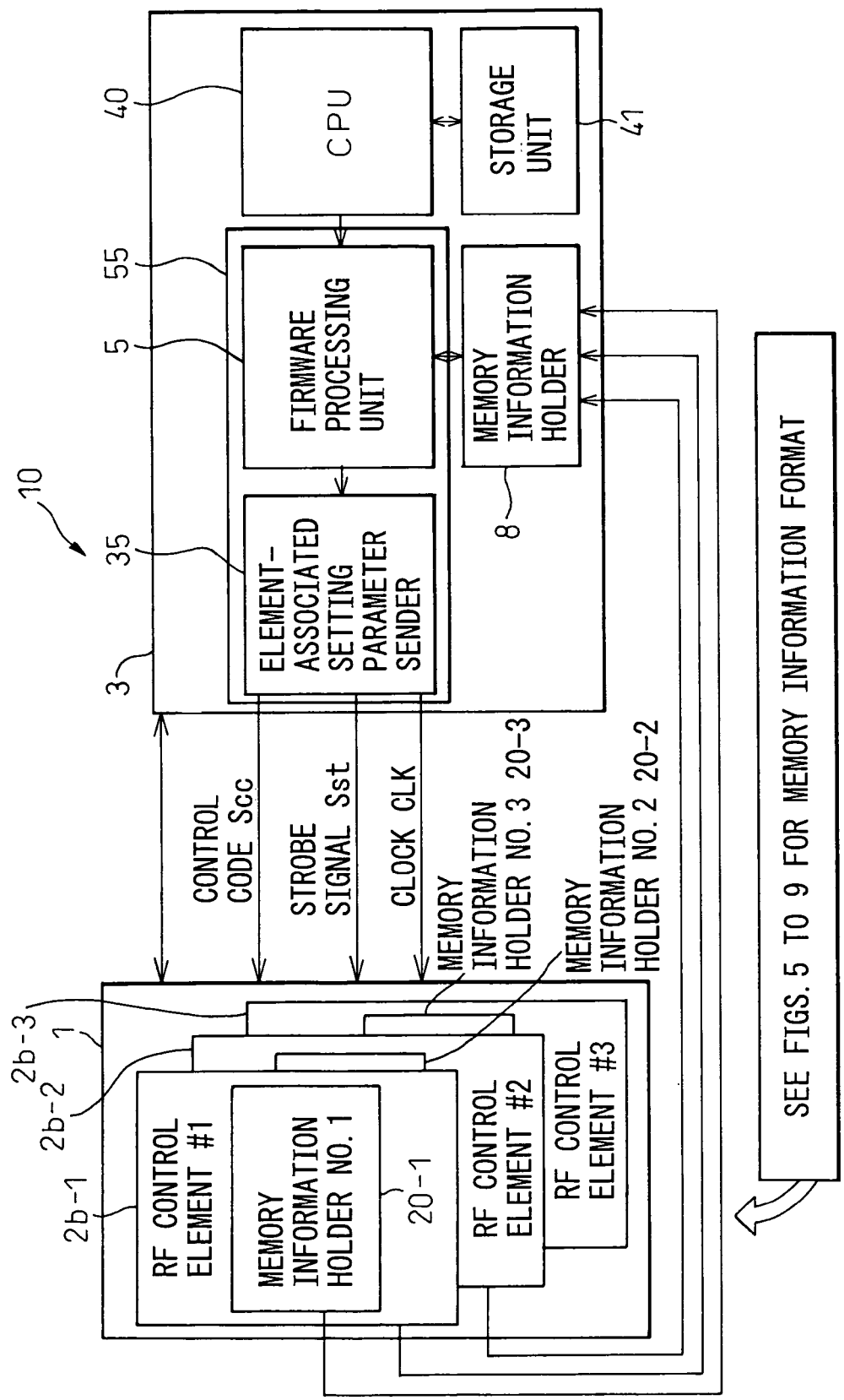
FIG. 4 is a block diagram showing a configuration of an RF communication control system according to a fourth embodiment of the present invention.

FIG. 4 is a block diagram showing a configuration of an RF communication control system according to a fourth embodiment of the present invention. Also in this case, the configuration of an RF communication control system 10 according to the fourth embodiment of the present invention is shown in simplified form.

The RF communication control system 10 according to the fourth embodiment shown in FIG. 4 comprises an RF control circuit unit 1 for executing the process of transmitting and receiving an RF signal and a baseband circuit unit 3 for executing various digital processes on the data contained in the RF signal and the intermediate-frequency signal sent out from the RF control circuit unit 1. Preferably, the RF control circuit unit 1 and the baseband circuit unit 3 are each fabricated as a LSI chip and independently of each other.

The chip of the RF control circuit unit 1 shown in FIG. 4 is configured to include all of a plurality of RF control elements #1 to #3. One of the plurality of the RF control elements #1 to #3 (typically including the RF control element #1 (2*b*-1), the RF control element #2 (2*b*-2), the RF control element #3 (2*b*-3) as shown in FIG. 3) is connected switchably to the baseband circuit unit 3.

Further, the plurality of the RF control elements #1 to #3 shown in FIG. 4 include memory information holders 20-1 to 20-3, respectively, for holding the setting parameters thereof, respectively. The memory information holders Nos. 1 to 3 (20-1 to 20-3) correspond to the setting parameter holders according to other embodiments of the present invention, and are each configured of a memory such as a RAM. The memory information holders 20-1 to 20-3 hold the memory information corresponding to the plurality of the RF control elements #1 to #3, respectively, and the memory information corresponding to a second RF control element to which a given RF control element is switched is read by the baseband circuit unit 3. In this case, the memory information of the memory information holders 20-1 to 20-3 are read at the time of switching the RF control elements and finally held in the memory information holders of the baseband circuit unit 3. Unlike the embodiments shown in FIGS. 1 to 3, therefore, the nonvolatile memory information is not required. Nevertheless, the format of the memory information is identical to that of the nonvolatile memory information according to the embodiments shown in FIGS. 1 to 3. This format is explained in detail, later, with reference to FIGS. 5 to 9.

Further, the baseband circuit unit 3 shown in FIG. 4 includes a setting parameter selection processing unit 55 for reading the setting parameter held in the memory information holder of a second RF control element after switching, temporarily holding the setting parameter in the memory information holder 8 of the baseband circuit unit 3 and sending it out to the second RF control element of the RF control circuit unit 1 when switching one of the RF control elements connected to the baseband circuit unit 3 to the second RF control element. The setting parameter selection processing unit 55 includes a firmware processing unit 5 for selecting the setting parameter contained in the memory information held provisionally in the memory information holder 8 and an element-associated setting parameter sender 35 for sending out the setting parameter selected by the firmware processing unit 5 to the second RF control element after switching of the RF control circuit unit 1. Preferably, the functions of the firmware processing unit 5 and the element-associated setting parameter sender 35 are implemented by a DSP (not shown) for processing the digital signal by firmware.

More specifically, the program stored in the storage unit 41 shown in FIG. 4 includes the step of reading the setting parameter held in the memory information holder of the second RF control element after switching, holding the setting parameter in the baseband circuit unit and sending out the setting parameter to a second RF control element when one of the RF control elements connected to the baseband circuit unit is switched and changed to the second RF control element.

The second RF control element after switching of the RF control circuit unit 1 shown in FIG. 4 is controlled by the control protocol SP contained in the setting parameter sent out from the element-associated setting parameter sender 35. This control protocol SP includes a serial control code Scc used as an interface of the set value of the setting parameter, a strobe signal Ss and a clock CLK. According to the embodiment shown in FIG. 4, the interface of the set value of the setting parameter is a serial control code, to which the present invention is not limited.

Further, the baseband circuit unit 3 shown in FIG. 4 includes a CPU 40 for performing various digital processes in collaboration with the DSP and a storage unit 41 such as a ROM or a RAM.

According to the fourth embodiment of the present invention, the memory information holder of each of a plurality of RF control elements holds the setting parameter for each of a plurality of the RF control elements. When one RF control element connected to the baseband circuit unit is switched to a second RF control element, the setting parameter held in the memory information holder of the second RF control element after switching is read by the DSP or the like, held temporarily in the memory information holder of the baseband circuit unit and then sent out to the second RF control element after switching.

According to the fourth embodiment of the present invention, therefore, one RF control element connected to the baseband circuit unit can be switched and changed easily to a second RF control element simply by sending out the setting parameter read from the memory information holder of the RF control element to an RF control element without taking the trouble to change the firmware or other processing format of the baseband circuit.

FIG. 5 is a data format diagram showing a specific example of a table of events of the nonvolatile memory information used in the embodiments of the present invention, and FIG. 6 a data format diagram showing a specific example of a table of event set values of the nonvolatile memory information used in the embodiments of the present invention.

In this case, an example of setting the setting parameters held in the nonvolatile memory information holder of the baseband circuit unit (or the memory information holder of the RF control elements) according to the first to fourth embodiments is illustrated in table form.

FIG. 5 illustrates a table of the index event X of the nonvolatile memory information. The event X is summarized in a table as X=0 (RF receiver process), X=1 (RF transmitter process), X=2 (RF receiver frequency setting process), X=3 (RF transmitter frequency setting process) and X=m (other processes) (m: an arbitrary positive integer not less than 4). As described above, it should be noted that the event X is comparatively specified among the setting parameters of the RF control elements of the RF communication control system used in W-CDMA format.

FIG. 6 illustrates a table of the index event set values Y of the nonvolatile memory information. Items related to the set value transmission process are selected as the event set value Y and summarized in a table as Y=0 (no set value sent out), Y=1 (set value sent out the first time), Y=2 (set value sent out the second time), Y=3 (set value sent out the third time) and Y=n (set value sent out the nth time) (n: an arbitrary positive integer not less than unity).

FIG. 7 is a data format diagram showing a specific example of a table of the number of times in which the event set values for a plurality of RF control elements are sent out. FIG. 8 is a data format diagram showing a specific example of a table of the number of times in which the event set value is sent out for a specified RF control element. FIG. 9 is a data format diagram showing a specific example of a table indicating the events and the event set values for a specified RF control element in the form of a two-dimensional (2D) matrix.

FIG. 7 illustrates a table of the number of times in which the event set value is sent out for a plurality of (three) RF control elements #1, #2 and #3 used in the embodiments described above (FIGS. 1 to 4). In this case, four set values including the RF receiver process, the RF transmitter process, the RF receiver frequency setting process and the RF transmitter frequency setting process are selected as events X. The number of times in which the event set value X is sent out is set for each of the events X and formed into a table.

In the firmware processing unit (FIGS. 1 to 4, for example), as shown in FIG. 8, the nonvolatile memory information in the table of the number of times in which the event set value is sent out, corresponding to the event X and the event set value Y, for a specified RF control element (say, the RF control element #1), are read, and the setting parameter is set for the specified RF control element.

FIG. 9 illustrates a table of the events and the event set values indicated as a two-dimensional matrix for a specified RF control element (RF control element #1, for example).

In the case in which the specified RF control element #1 is used for the baseband circuit unit, for example, the number of times in which the event set value of the RF control element #1 is sent out as shown in FIG. 8 and the sent-out event set value of the RF control element #1 as shown in FIG. 9 are used. In the case in which the event X is a RF receiver process, the firmware processing unit of the baseband circuit unit reads the nonvolatile memory information of [X][Y]=[0][0] to determine the number of times in which the event set value is sent out. In this case, the number of times in which the event set value is sent out is two, and therefore the event set value Y is sent out twice. The event set values sent out include the first set value written as [X][Y]=[0][1] sent out concerning the receiver and the second set value written as [X][Y]=[0][2] sent out concerning the receiver. A similar process is executed also for the other events.

Preferably, the system has a plurality of two-dimensional matrix tables, as described above, so that the system can be switched to an arbitrary two-dimensional matrix table based on the setting information of the RF control element provided from an external source.

Figure 11A:
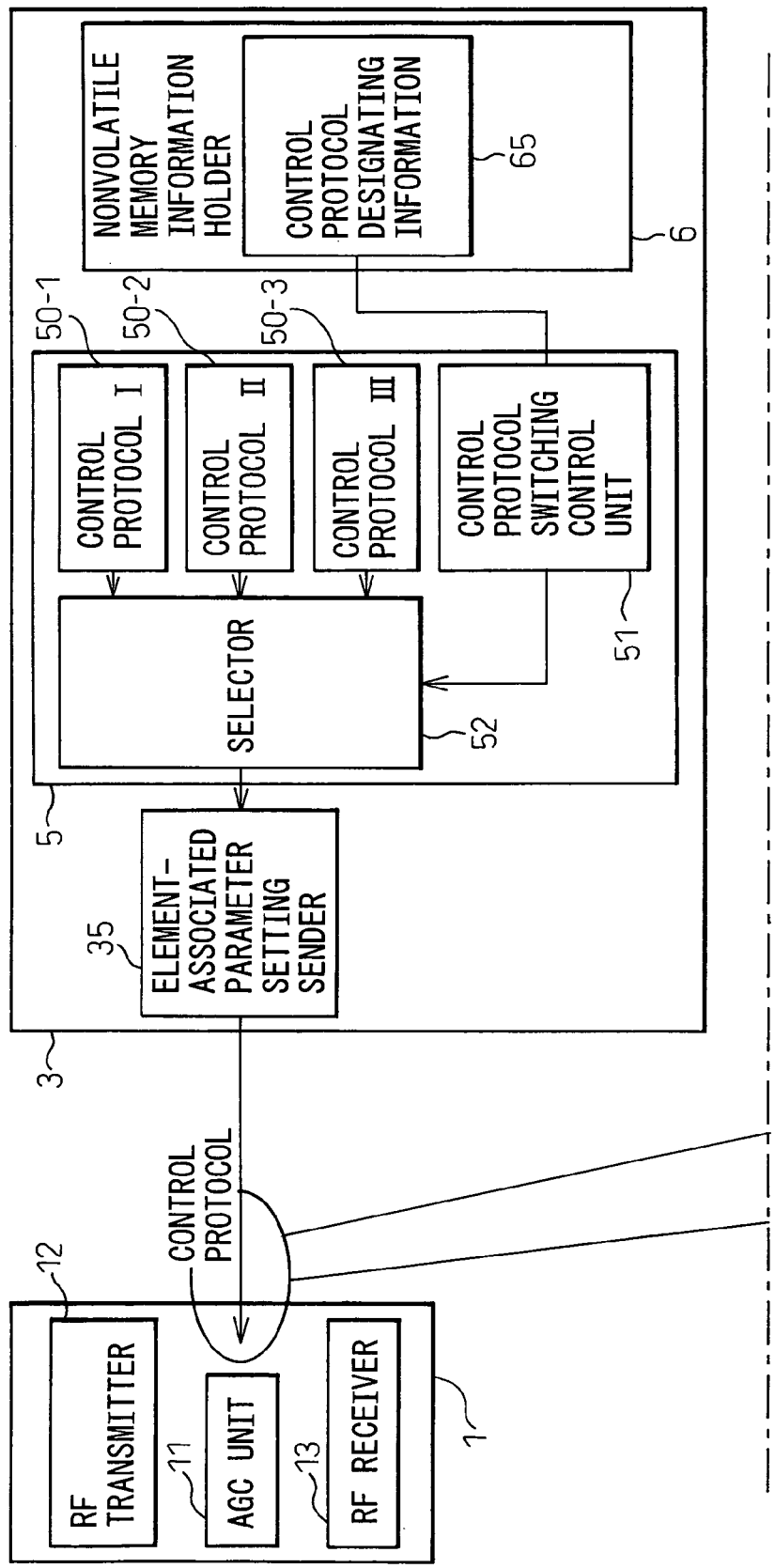
FIG. 11A and FIG. 11B are signal flow diagrams each showing the manner in which a control protocol corresponding to each RF control element is sent out for changing the connection of a plurality of the RF control elements according to an embodiment of the present invention.
Figure 11B:
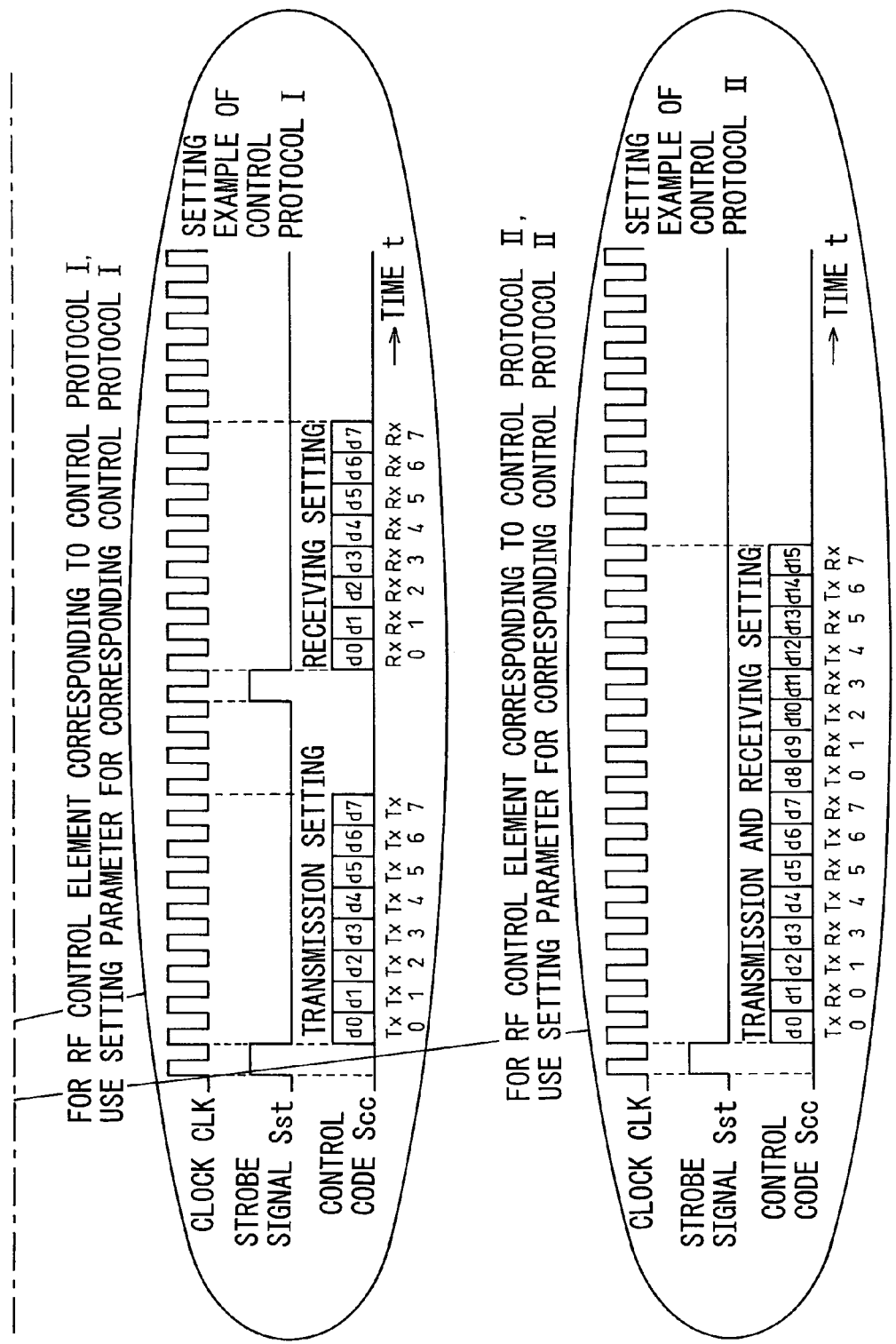

FIG. 10 is a signal flow diagram showing the manner in which an RF low-noise exponential amplifier is selectively controlled in the conventional RF communication control system; and FIG. 11A and FIG. 11B are signal flow diagrams each showing the manner in which a control protocol corresponding to each element is sent out for changing the connection of a plurality of RF control elements according to an embodiment of the present invention.

In this case, in order to clarify the features of the RF communication control system according to the present invention further, the manner in which the RF low-noise exponential amplifier of the conventional RF communication control system performs the selective control operation (described in Patent Document 1 mentioned above) is compared with the manner in which the control protocol corresponding to each element is sent out for changing the connection of a plurality of RF control elements according to an embodiment of the present invention (shown in FIGS. 1 to 4) with reference to FIGS. 10 and 11.

The conventional RF communication control system (signal processing system) shown in FIG. 10 has been conceived to improve the receiving quality of television. As shown in FIG. 10, in the conventional RF communication control system, the signal level thresholds 420 of the tuned channel frequency f0 and neighboring frequencies f1, f2 are held in a memory 410 beforehand. The RF receiving circuit 100, on the other hand, measures the signal levels of the tuned channel frequency f0 and the neighboring frequencies f1, f2 (frequency f).

Further, in the comparator 405 of the processor 400, the magnitude of the signal level (receiving signal Rx) having the tuned channel frequency f0 obtained by converting the analog signal output as the signal level measurement result described above into a digital signal by the analog-to-digital converter (ADC) unit 105 is compared with a predetermined signal level threshold 420. In accordance with the result of this comparison, it is determined whether or not the AGC control operation is performed in the AGC (automatic gain control) unit 110 of the RF receiving circuit 100 while, at the same time, determining whether or not a similar AGC operation is to be performed for the neighboring frequencies f1, f2. In this case, as the result of a comparative operation by the comparator 405 of the processor 400, the setting of the control protocol (the control code Scc, the strobe signal Sst and the clock CLK shown in FIG. 10, for example) for the RF control element is changed. What is changed, however, is limited to the contents (d0, d1, d2, . . . ,d7) of the control data (control code), and indicates only the predetermined AGC operation for the RF control element. In other words, in the conventional RF communication control system shown in FIG. 1, the setting parameter including a combination of events and event set values, as in this invention, is not changed at all. Further, in the conventional RF communication control system shown in FIG. 10, no method is disclosed or pointed out for sending out different control protocols corresponding to different RF control elements.

The RF communication control system according to the present invention shown in FIGS. 11A and 11B, on the other hand, is so configured that the interface timing (timing of the control data, strobe signal and the clock) and the control protocol are changed in accordance with the connection of a different RF control element. In this configuration, as described above, a plurality of RF control elements can be selectively connected to the baseband circuit unit. Generally, to meet the requirement of all the multipurpose RF control elements, an infinite number of control protocols are required to be prepared for all the RF control elements, and therefore a limitless program capacity of the firmware processing unit 5, such as the DSP, is required.

The RF communication control system according to the present invention, as described above, is based on the assumption that the process for controlling the RF control elements is classified into at least four events (RF receiver process, RF transmitter process, RF receiver frequency setting process and the RF transmitter frequency setting process, i.e. frequency setting and power save control). Upon this assumption, the setting parameter tables shown in FIGS. 5 to 9 are used. Thus, the control protocol can be sent out to the RF control circuit unit 1 to meet the requirement of substantially all the RF control elements by a smaller amount of the process of DSP, etc.

More specifically, as shown in FIGS. 11A and 11B, the RF control circuit unit 1 includes an RF transmitter 12 for transmitting an RF signal, an RF receiver 13 for receiving an RF signal and an AGC (automatic gain control) unit 11 for performing the AGC operation in accordance with the control protocol (the control code Scc, the strobe signal Sst and the clock CLK shown in FIG. 11B).

On the other hand, the baseband circuit unit 3 shown in FIG. 11A includes a nonvolatile memory information holder 6 for holding the setting parameter of each of a plurality of RF control elements in advance. This nonvolatile memory information holder 6 holds the control protocol designating information 65 corresponding to the RF control elements, together with the setting parameter for each of a plurality of the RF control elements.

Further, the baseband circuit unit 3 shown in FIG. 11 includes a firmware processing unit 5 for selecting the setting parameter contained in the nonvolatile memory corresponding to the RF control elements held in the nonvolatile memory information holder 6 and inputting the control protocol designating information corresponding to the RF control elements, and an element-associated setting parameter sender 35 for sending out the control protocol and the setting parameter selected by the firmware processing unit 5 to the RF control circuit unit 1.

More specifically, the firmware processing unit 5 shown in FIG. 11A includes a control protocol switching control unit 51 for switching a plurality of control protocols (for example, a control protocol I 50-1, a control protocol II 50-2 and a control III 50-3) in accordance with the control protocol designating information corresponding to the RF control elements, and a selector 52 for selecting the control protocol corresponding to each RF control element in accordance with the switching operation of the control protocol switching control unit 51.

As long as the second RF control element after switching shown in FIGS. 11A and 11B corresponds to the control protocol I, for example, as shown in the upper signal flow diagram of FIG. 11B, the control code Scc, the strobe signal Sst and the clock CLK are generated as events of the transmission setting and the receiving setting using the setting parameters for the corresponding control protocol I. In this case, two types of control codes (d0, d1, d2 , , , ,d7) for chronologically separating (with respect to time t) the transmission setting event (setting of the transmission signal Tx) and the receiving setting event (setting of the receiving signal Rx) are used as a control protocol.

In the case in which the second RF control element after switching shown in FIGS. 11A and 11B corresponds to the control protocol II, on the other hand, as shown in the lower signal flow diagram in FIG. 11B, the control code Scc, the strobe signal Sst and the clock CLK are generated for the transmission setting event and the receiving setting event using the setting parameter for the corresponding control protocol II. In this case, the control data (control code) (d0, d1, d2, . . . ,d15) for the chronologically continuous transmission setting and receiving setting events are used as a control protocol.

FIG. 12 is a flowchart for explaining the flow of the setting process of the setting parameter corresponding to the second RF control element after switching according to the embodiment shown in FIG. 3. With reference to this flowchart, an explanation is given about the setting process executed to set the setting parameter corresponding to the RF control element by the operation of the DSP or the CPU (FIG. 3) of the baseband circuit unit (FIG. 3). In this case, the setting parameter of each of a plurality of the RF control elements is assumed to be held in advance by the nonvolatile information holder (FIG. 3) of the baseband circuit unit.

First, at step S10, the whole RF communication control system is initialized. Next, at step S11, the setting parameter to be used for the second RF control element after switching is determined based on the setting information provided by a host application of a host device for setting a second RF control element after switching when switching one RF control element connected to the baseband circuit unit to the second RF control element.

Further, at step S12, the setting parameter contained in the nonvolatile memory information corresponding to the second RF control element after switching is selectively switched based on the determined result of the setting parameter.

Furthermore, at step S13, the setting parameter corresponding to the second RF control element after switching is sent out to the particular RF control element.

In this way, at step S14, the setting process of the second RF control element after switching is finally completed.

FIG. 13 is a flowchart for explaining the setting process flow for setting the setting parameter corresponding to the second RF control element after switching according to the embodiment shown in FIG. 4. With this flowchart, an explanation is given about the setting process for setting the setting parameter corresponding to the RF control element by the operation of the DSP or the CPU (FIG. 4) of the baseband circuit unit (FIG. 4). In this case, the setting parameter for each of a plurality of RF control elements is assumed to be held in advance by the memory information holder of each of a plurality of RF control elements.

First, at step S20, the whole RF communication control system is initialized. Next, at step S21, the memory information held in the memory information holder of a second RF control element is read when one RF control element connected to the baseband circuit unit is switched to the second RF control element.

Further, at step S22, the memory information thus read is temporarily held in the memory information holder of the baseband circuit unit.

Furthermore, at step S23, the setting parameter contained in the memory information temporarily held is sent out to the second RF control element after switching as a setting parameter corresponding to the particular second RF control element.

In this way, at step S24, the setting process for the second RF control element after switching is finally completed.

With regard to the industrial applicability of the present invention, the present invention finds application in radio communication devices, such as a mobile phone used in W-CDMA format, in which the setting parameter of a plurality of RF control elements can be easily changed to connect the RF control elements selectively to the baseband elements.

The invention claimed is:

1. An RF communication control system comprising an RF control circuit unit for executing a process of transmitting and receiving an RF signal and a baseband circuit unit for executing various digital processes on data contained in the RF signal sent out from the RF control circuit unit:

wherein one of a predetermined number of RF control elements is connected selectively to the baseband circuit unit;

wherein the baseband circuit unit includes a setting parameter holder for holding a predetermined setting parameter for each of the predetermined number of the RF control elements, a setting parameter determining unit for determining the setting parameter to be used for a second RF control element based on the setting information supplied from an external source for the second RF control element, in the case in which the RF control element connected to the baseband circuit unit is switched to the second RF control element, and a setting parameter selection processing unit for selecting the setting parameter corresponding to the second RF control element from the setting parameter holder based on the result determined by the setting parameter determining unit and sending out the selected setting parameter to the second RF control element, wherein the setting parameter for each of the plurality of the RF control elements held in the setting parameter holder is indicated by a two-dimensional matrix including two elements, where the elements comprise an event and an event set value for each of the plurality of the RF control elements, and wherein an event set value of 0 of the two-dimensional matrix indicates the number of times in which the event set value is sent out, an event set value of 1 indicates a first event set value sent out, an event set value of 2 indicates a second event set value sent out and an event set value of n indicates an nth event set value sent out.

2. An RF communication control system according to claim 1, wherein, in the case in which the setting parameter selection processing unit is implemented by firmware, the one RF control circuit element connected to the baseband circuit unit can be switched to the second RF control circuit element simply by changing the setting parameter selected from the setting parameter holder without changing the firmware processing format.

3. An RF communication control system according to claim 1, comprising a plurality of the two-dimensional matrices one of which is adapted to be switched to another thereof based on the setting information provided from the external source for the second RF control circuit element.

4. An RF communication control system according to claim 1, wherein the setting information for the second RF control circuit element is provided from an external setting pin included in the baseband circuit unit.

5. An RF communication control system according to claim 1, wherein the setting information for the second RF control circuit element is provided from a host device for controlling the baseband circuit unit.

6. An RF communication control system comprising an RF control circuit unit for executing a process of transmitting and receiving an RF signal and a baseband circuit unit for executing various digital processes on data contained in the RF signal sent out from the RF control circuit unit:

wherein the RF control circuit unit includes a predetermined number of RF control circuit elements each having a predetermined setting parameter holder for holding the setting parameter for each of the RF control circuit elements, and one of the RF control circuit elements is connected selectively to the baseband circuit unit;

wherein the baseband circuit unit includes a setting parameter selection processing unit which, when the RF control circuit element connected to the baseband circuit unit is switched to a second RF control circuit element, reads and holds the setting parameter held in the setting parameter holder of the second RF control circuit element, and sends out the setting parameter to the second RF control circuit element, wherein the setting parameter for each of the plurality of the RF control elements held in the setting parameter holder is indicated by a two-dimensional matrix including two elements, where the elements comprise an event and an event set value for each of the plurality of the RF control elements, and wherein an event set value of 0 of the two-dimensional matrix indicates the number of times in which the event set value is sent out, an event set value of 1 indicates a first event set value sent out, an event set value of 2 indicates a second event set value sent out and an event set value of n indicates an nth event set value sent out.

7. An RF communication control method for executing a process of transmitting and receiving an RF signal through an RF control circuit unit including a predetermined number of RF control circuit elements and executing various digital processes on data contained in the RF signal through a baseband circuit unit connected with one of the RF control circuit elements, the method comprising the steps of:
  holding a predetermined setting parameter of each of the RF control circuit elements through a setting parameter holder of the baseband circuit unit;
  when an RF control circuit element connected to the baseband circuit unit is switched to a second RF control circuit element, determining a predetermined setting parameter to be used for the second RF control circuit element based on a setting information for the second RF control circuit element supplied from an external source; and
  selecting the setting parameter corresponding to the second RF control circuit element based on a result determined by the setting parameter and sending out the setting parameter to the second RF control circuit element,
  wherein the setting parameter for each of the plurality of the RF control elements held in the setting parameter holder is indicated by a two-dimensional matrix including two elements, where the elements comprise an event and an event set value for each of the plurality of the RF control elements, and
  wherein an event set value of 0 of the two-dimensional matrix indicates the number of times in which the event set value is sent out, an event set value of 1 indicates a first event set value sent out, an event set value of 2 indicates a second event set value sent out and an event set value of n indicates an nth event set value sent out.

8. An RF communication control method for executing a process of transmitting and receiving an RF signal through an RF control circuit unit including a predetermined number of RF control circuit elements and executing various digital processes on data contained in the RF signal through a baseband circuit unit connected with one of the RF control circuit elements, the method comprising the steps of:
  holding a predetermined setting parameter of each of the RF control circuit elements through a setting parameter holder of each of the RF control circuit elements;
  when the RF control circuit element connected to the baseband circuit unit is switched to a second RF control circuit element, reading the setting parameter held in the setting parameter holder of the second RF control circuit element, holding the setting parameter in the baseband circuit unit, and sending out the setting parameter to the second RF control circuit element,
  wherein the setting parameter for each of the plurality of the RF control elements held in the setting parameter holder is indicated by a two-dimensional matrix including two elements, where the elements comprise an event and an event set value for each of the plurality of the RF control elements, and
  wherein an event set value of 0 of the two-dimensional matrix indicates the number of times in which the event set value is sent out, an event set value of 1 indicates a first event set value sent out, an event set value of 2 indicates a second event set value sent out and an event set value of n indicates an nth event set value sent out.

9. A non-transitory computer-readable storage medium for use in an RF communication control system comprising an RF control circuit unit including a predetermined number of RF control circuit elements for executing a process of transmitting and receiving an RF signal and a baseband circuit unit for executing various digital processes on data contained in the RF signal sent out from the RF control circuit unit, one of the predetermined number of the RF control circuit elements of the RF control circuit unit being connected selectively to a baseband circuit unit, a setting parameter holder of the baseband circuit unit holding a predetermined setting parameter for each of the RF control circuit elements;
  said computer-readable storage medium storing a computer program whereby when the RF control circuit element connected to the baseband circuit unit is switched to a second RF control circuit element, the setting parameter to be used for the second RF control circuit element is determined based on the setting information supplied from an external source for the second RF control circuit element, and the setting parameter corresponding to the second RF control circuit element is selected based on the result of determining the setting parameter and sent out to the second RF control circuit element,
  wherein the setting parameter for each of the plurality of the RF control elements held in the setting parameter holder is indicated by a two-dimensional matrix including two elements, where the elements comprise an event and an event set value for each of the plurality of the RF control elements, and
  wherein an event set value of 0 of the two-dimensional matrix indicates the number of times in which the event set value is sent out, an event set value of 1 indicates a first event set value sent out, an event set value of 2 indicates a second event set value sent out and an event set value of n indicates an nth event set value sent out.

10. A non-transitory computer-readable storage medium for use in an RF communication control system comprising an RF control circuit unit including a predetermined number of RF control circuit elements for executing a process of transmitting and receiving an RF signal and a baseband circuit unit for executing various digital processes on a data contained in the RF signal sent out from the RF control circuit unit, one of the predetermined number of RF control circuit elements of the RF control circuit unit being connected to the baseband circuit unit, a setting parameter holder of each of the RF control circuit elements holding a predetermined setting parameter for each of the RF control circuit elements;
  said computer-readable storage medium storing a computer program whereby when the RF control circuit element connected to the baseband circuit unit is switched to a second RF control circuit element, the setting parameter held in the setting parameter holder of the second RF control circuit element is read, held in the baseband circuit unit and sent out to the second RF control circuit element,
  wherein the setting parameter for each of the plurality of the RF control elements held in the setting parameter holder is indicated by a two-dimensional matrix including two elements, where the elements comprise an event and an event set value for each of the plurality of the RF control elements, and
  wherein an event set value of 0 of the two-dimensional matrix indicates the number of times in which the event set value is sent out, an event set value of 1 indicates a first event set value sent out, an event set value of 2 indicates a second event set value sent out and an event set value of n indicates an nth event set value sent out.

* * * * *